Figure 1:
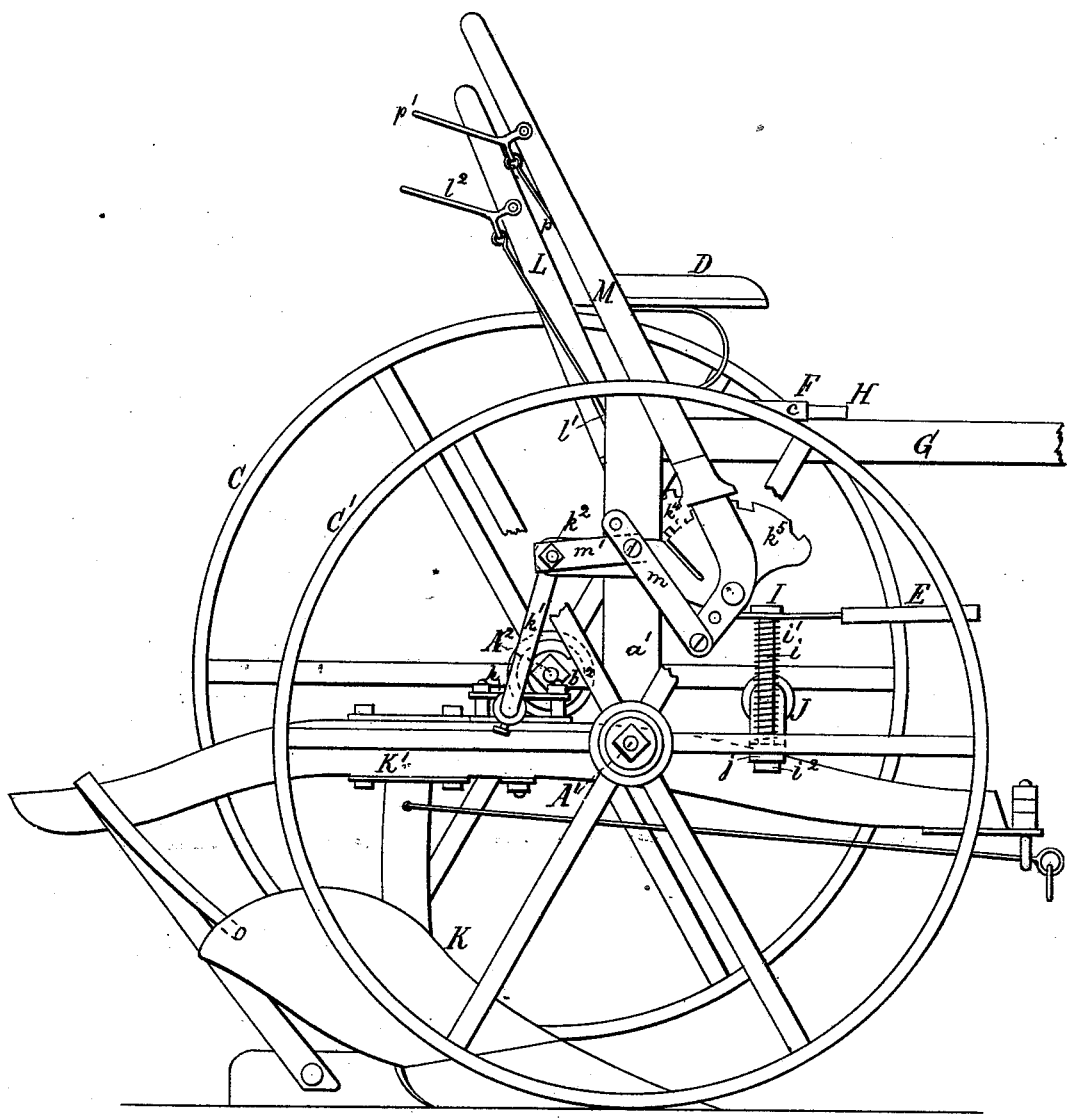

(No Model.)

F. F. SMITH.
Sulky Plows.

No. 235,175.

3 Sheets—Sheet 1.

Patented Dec. 7, 1880.

Witnesses:
J. F. Munson
J. P. Theo Lang.

Inventor:
Francis F. Smith
by
Munn, Renwick & Lawrence
his attys

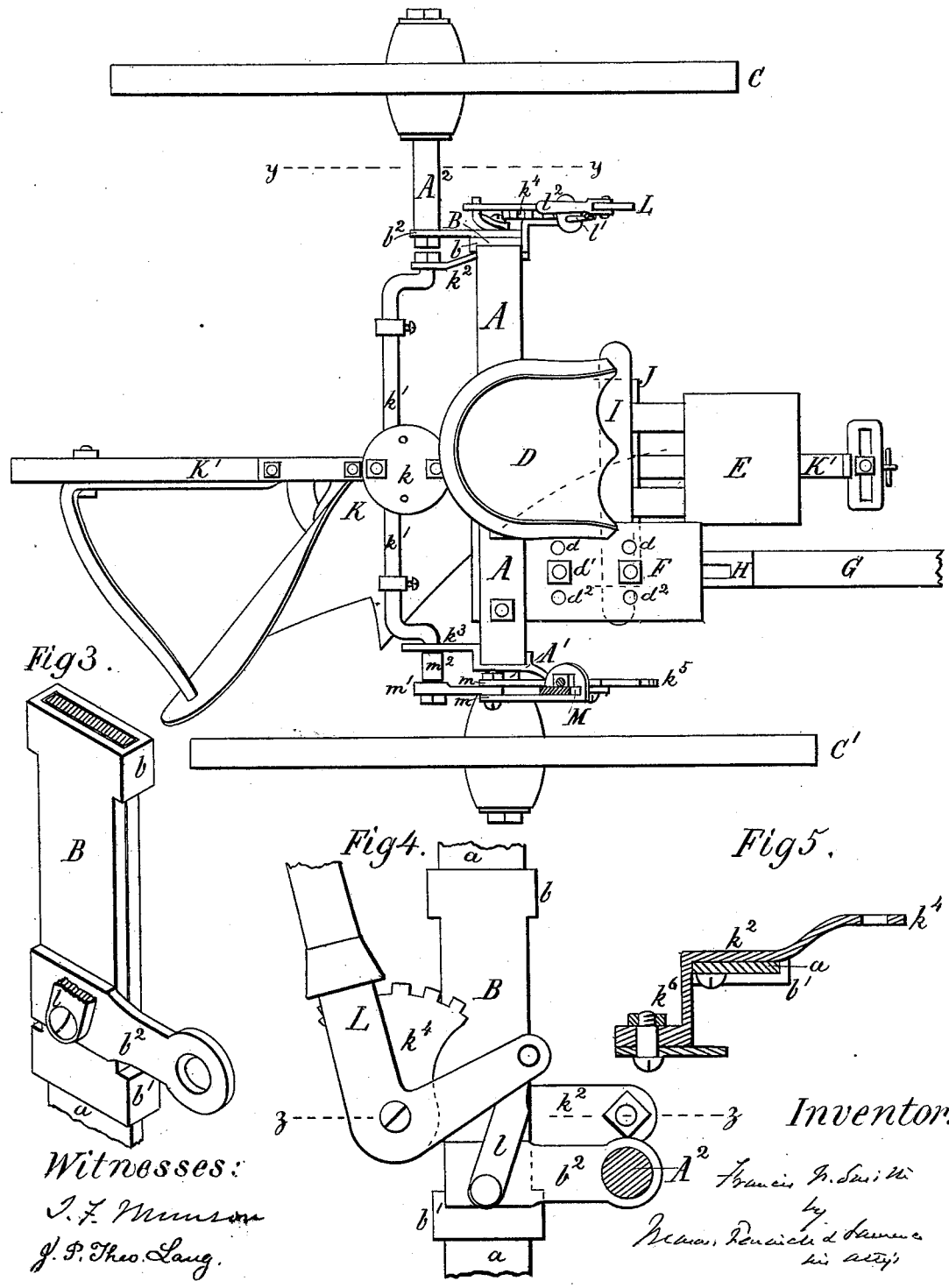

(No Model.) 3 Sheets—Sheet 3.
F. F. SMITH.
Sulky Plows.
No. 235,175. Patented Dec. 7, 1880.
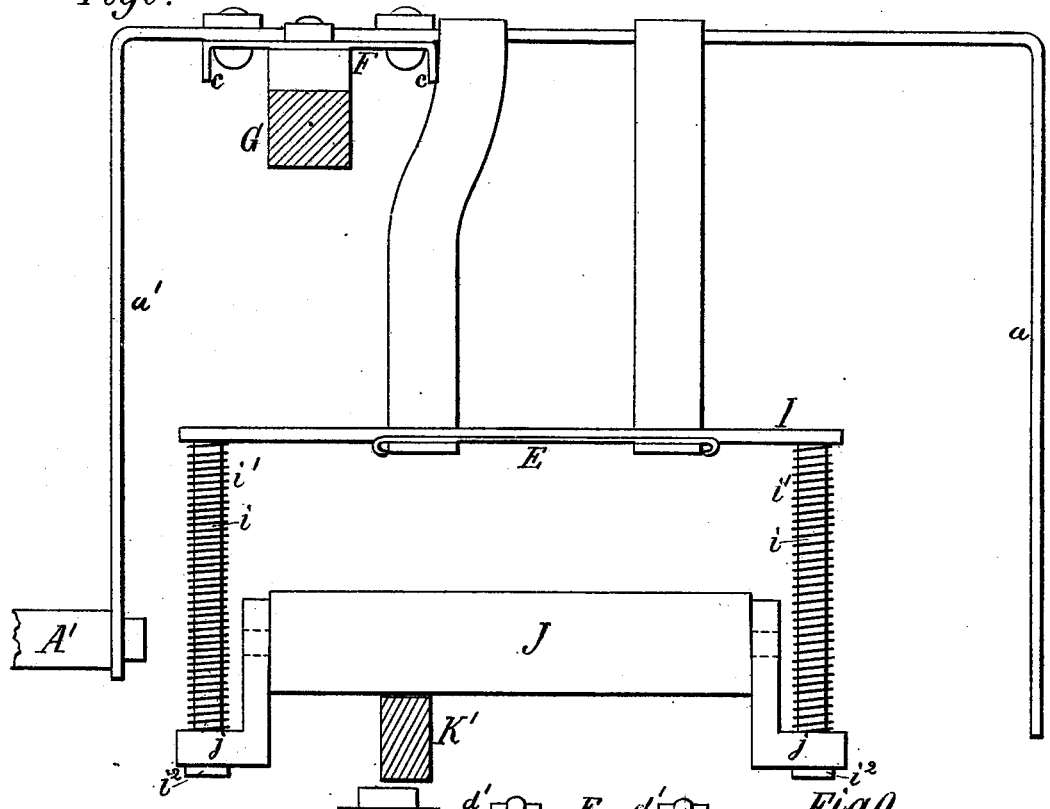
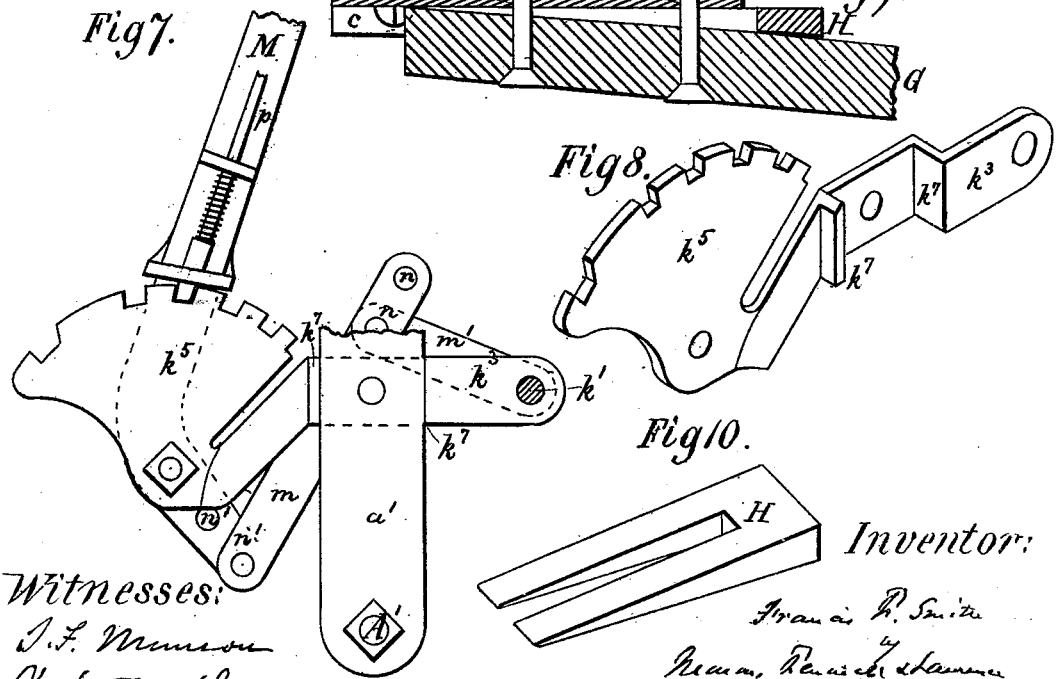
Witnesses:
J. F. Munson
J. P. Theo. Lang
Inventor:
Francis F. Smith
by Munn, Renwick & Lawrence
his attys

UNITED STATES PATENT OFFICE.

FRANCIS F. SMITH, OF AURORA, ILLINOIS.

SULKY-PLOW.

SPECIFICATION forming part of Letters Patent No. 235,175, dated December 7, 1880.

Application filed May 22, 1880. (No model.)

*To all whom it may concern:*

Be it known that I, FRANCIS F. SMITH, a citizen of the United States, residing at Aurora, in the county of Kane and State of Illinois, have invented a new and useful Sulky-Plow, of which the following is a specification.

The invention relates to sulky-plows in which the carriage-wheels are applied on an arched supporting-bar, and the plow loosely hung upon a crank-shaft supported upon and in rear of the arched supporting-bar; and the objects of my improvements are, first, to provide a toothed sector which locks the lifting hand-lever in different positions, and a bracket which gages the position which the sector is to occupy, and supports the crank-shaft upon which the plow is hung, and also supports the sector, said sector and bracket being in one piece and fastened to the arched supporting-bar, one of the ends of the casting being forward of the arched bar and the other in rear thereof, the sector being at the front end, and the crank-shaft on which the plug is hung being passed through the rear end; second, to provide a lifting hand-lever and toggle-lever, in connection with the sector and the extension-bracket thereof, whereby the crank-axle on which the plow is hung can be readily and easily operated for the purpose of raising and lowering the plow while the carriage is in motion, and this, too, notwithstanding the arms or axles of the arched supporting-bar upon which the carriage-wheels are applied are one forward of the other; third, to provide means whereby the axle-arms may be placed out of line with each other, the crank-arms of the shaft which supports the plow may be arranged in line with one another, the landside-wheel set higher or lower, and the plow raised or lowered, as occasion may require; fourth, to provide the sector on the landside of the plow-carriage with a bracket which serves as a set-gage for the sector and as a support for one end of the crank-shaft upon which the plow is hung, and the lifting-lever of the landside-wheel of the carriage with a link and a slide, the latter abutting against the set-gage bracket in both its up and down extreme movements; fifth, to provide a spring check-roller and side stops for the front end of the plow-beam to press against when said beam is suddenly thrown up or deflected laterally in either a right-hand or left-hand direction. I attain these objects by the mechanism illustrated in the accompanying drawings, in which—

Figure 1 is a side elevation of the sulky-plow as it appears while plowing, one wheel being in the furrow and the other on the landside. Fig. 2 is a top-view of the plow, the lifting-lever and locking-bolt on the furrow side of the carriage being shown in horizontal section. Fig. 3 is a perspective view of the parts which support the landside-wheel and the slide and a portion of the link by which it is connected to the landside-lifting lever, a portion of the arched support of the sulky-plow being also shown. Fig. 4 is a detail broken elevation and partial section in the line $y\ y$ of Fig. 2. Fig. 5 is a detail horizontal section in the line $z\ z$ of Fig. 4. Fig. 6 is a broken front elevation and partial section, showing the plow-beam, the tongue, tongue-plate, foot-platform, arched support, furrow-side axle, and the spring-roller check and side stops for the plow-beam to press against. Fig. 7 is an elevation of the mechanism for raising and lowering the plow. (Seen from the landside.) Fig. 8 is a perspective view of the sector and its gage-bracket shown in Fig. 7. (Seen from the landside.) Fig. 9 is a detail section of the rear end of the tongue, the wedge and tongue and arched bar being also sectioned. Fig. 10 is a perspective view of the forked wedge.

Similar letters refer to similar parts throughout all the views.

The arched or angular supporting-bar A has its vertical legs $a\ a'$ made with front and rear edges parallel with one another, and to the leg $a$ the axle $A'$ is connected directly, and to the leg $a'$ the axle $A^2$ is connected indirectly, by means of a vertical slide, B, having two loops, $b\ b'$, and a horizontal bracket-arm, $b^2$, attached to or formed on it. The arm $b^2$ extends back from the center line of the axle $A'$, and into its rear end the axle $A^2$ is confined.

On the axles $A'$ and $A^2$ carriage-wheels C C' are applied, to revolve loosely thereon.

To the top portion of the arch-bar A, near its center, the driver's seat D and foot-platform E are fastened, as shown, and on one side of the parts D and E a tongue-plate, F, is fastened to the top portion of the bar A, it being bolted against the under surface of said top portion of the bar A. This plate F is formed of metal, and has its side edges turned down to form stiffening-flanges c c. Through the plate three lines of bolt-holes, d d' d², are made. To the under side of the plate the tongue G is bolted after being placed in line with either of the lines of bolt-holes.

The upper side of the rear portion of the tongue is beveled off, and between the plate F and the beveled surface of the tongue an adjusting-wedge, H, is applied, this wedge being forked and its prongs passing, respectively, outside of the fastening-bolts of the tongue, and by this means the tongue can be adjusted higher or lower, to suit the height of the horses and plow, and at the same time the wedge is prevented from slipping out of place laterally.

To the side bars of the foot board or platform E a cross-bar, I, having two pendent rods, i i, applied to it, is fastened. The rods i i have spiral springs i' i' wound around them, and on their lower ends screw-threads and nuts, as indicated at i² i², are provided.

A revolving roller, J, hung by its journals in angular stop-pieces j j, is connected to the rods i i by slipping the horizontal portions of the stop-pieces j j upon the lower ends of the rods and against the lower ends of the spiral springs i' i', as shown.

The plow-beam K' is connected to the arched bar A by means of a suitable coupling, k, a crank-shaft, k', and bracket-arms k² and k³ of toothed sectors k⁴ k⁵, as shown.

The bracket-arm k² is formed with a right-angle bend, k⁶, and by means of this bend a set-gage for properly setting the sector k⁴ upon the arched bar A is secured, and no inconvenience is experienced from having the sector and bracket rigidly united together before the parts are bolted to the leg a of the arched bar.

It is apparent that when the right-angle bend of the bracket adjoins the front vertical edge of the leg a the sector k⁴ will stand in its proper position, which position is determined upon by experiment and trial before making the parts. The bracket of the sector k⁴ is set midway of the length of movement made by the slide B, and by this means the loops b b' of the slide serve, respectively, as stops for determining the extent of up-and-down movement of the slide B.

On the pin or bolt of the sector k⁴ a lever, L, is pivoted. This lever has an angular bend at its lower end, and to its short arm a pivoted link, l, is connected, said bar being pivoted to the inner or front end of the bracket b² of the slide and to the slide.

The usual spring locking-latch l' and thumb-lever l² are provided upon the lever L. By releasing the latch l' from the teeth of the sector, and moving the lever L in the proper directions, the landside-wheel C can be adjusted as desired, and the adjustment can be made from the driver's seat D.

The sector k⁵ is formed with two angular portions, k⁷, which serve as set-gages for the toothed sector k⁵, and by means of these angular portions k⁷ the said sector can be set in its proper working position, notwithstanding the bracket and sector are wrought in one piece, for as the edges of the leg a' of the arched supporting-bar A are parallel, and the bends k⁷ are also parallel, it follows that when the bracket k³ is fitted upon the leg a' the sector will occupy the proper position previously determined upon. It is quite a saving of expense as well as a great convenience to have the sector k⁵ and bracket k³ wrought or cast in one piece, as herein shown and described.

To the center of the sector k⁵ a lever, M, is pivoted. This lever has an angular bend at its lower end, and to its short arm a toggle-lever, m m', is connected, said toggle-lever having its portion m' pivoted to an extension end of the crank-shaft and confined from lateral movement by a tubular stay, m², on said extension end of the crank-shaft and a nut screwed on the end of the extension. The short arm of the lever and also the portion m of the toggle-lever m m' are provided with pivot-holes n n', whereby the length of leverage may be changed to run the plow below the level of wheel in striking out. The lever M is provided with the usual spring-latch p and thumb-lever p', for locking and unlocking it from the teeth of the sector. By moving the lever in the proper directions the shaft which supports the plow proper can be raised and lowered as occasion and circumstances may require.

The plow-beam K' extends under the spring-roller J and occupies a place between the stop-pieces j j, and when the plow meets with an obstruction which throws it up the beam strikes violently against the roller; but as the roller is held down by springs i', the jar and concussion will be taken from the whole plow except the roller and the beam. The roller prevents friction whenever the plow-beam is deflected obliquely or laterally, for as the beam glides against the roller laterally the roller turns and prevents wear and undue friction or bind, and the stops arrest the plow-beam from too great lateral movement.

What I claim as my invention, and desire to secure by Letters Patent, is—

1. The combination, with the supporting-bar A and crank-shaft k', of sector k⁵, having a bracket, k³, which binds against the side and edge or edges of the supporting-bar A, substantially as and for the purpose described.

2. The combination of the lever M, toggle-lever m m', sector k⁵, having a bracket, k³, and the crank-shaft k', and supporting-bar A, substantially as and for the purpose described.

3. The combination of the sectors k⁴ k⁵, having brackets k² k³, in combination with the slide B, having a bracket, b², the axles A' A² of the sulky-carriage, set out of line with one another, and the crank-shaft k', having its arms in line with each other, substantially as and for the purpose described.

4. The combination, with the supporting-bar A and crank-shaft k', of sector k⁴ on the landside of the carriage, provided with a bracket, $k^2$, which serves both as a set-gage for the sector and as an extended support for one end of the crank-shaft, a lever, link, and a slide, B, the parts being arranged to limit the extreme up and down movements of the slide, substantially as described.

5. The spring check-roller J, suspended upon a supporting-frame provided with stops, in combination with the plow-beam K', whereby a spring-roller and a laterally-vibrating plow-beam are adapted for operating together in a sulky-plow, substantially as and for the purpose described.

FRANCIS F. SMITH.

Witnesses:
J. W. LOCKWOOD,
EDWARD D. NORTHAM.